INVENTOR.
Frederick J. Bracey, Jr.
BY
James F. Snowden
Attorney

United States Patent Office 3,303,255
Patented Feb. 7, 1967

3,303,255
PROCESS FOR BONDING THERMOPLASTIC
MATERIALS
Frederick J. Bracey, Jr., Somers, Conn., assignor to Mobil
Oil Company, a corporation of New York
Filed Jan. 11, 1965, Ser. No. 424,763
9 Claims. (Cl. 264—248)

The present invention relates to a method for heat sealing or bonding flexible layers of materials containing weldable thermoplastic resins. In a particular embodiment it is concerned with bonding parts of articles which vary considerably in thickness and which are formed from sheet materials.

A variety of procedures and equipment have been suggested for use in heat sealing sheets composed of resins of a thermoplastic nature. However, difficulties have been encountered in certain applications, especially where one or more layers of material are of uneven gauge or thickness, for in such cases there are frequently gaps in the weld or seal due to the lack of the necessary full and firm contact between the layers of material during the bonding operation. Also, such lack of intimate contact usually has a cumulative effect in that the necessary heat transfer across the areas involved is greatly reduced by the insulating effect of air spaces between layers. The resulting incomplete welds or seals are not only annoying, but they are generally unacceptable in sealing commercial containers holding various products that require protection against moisture, air or extraneous liquids.

Considerable variations in the gauge of materials to be sealed are frequently encountered in the thermoplastic containers produced by various molding techniques including injection molding, blow molding, compression molding and the thermoforming of sheet material using heat and a fluid pressure differential. Also, such gauge variations are especially pronounced in the forming or molding of three-dimensional articles of angular configuration and thin walls, such as containers of rectangular cross section and those of considerable depth. Conventional heat sealing operations tend to decrease in efficiency somewhat when the variation in thickness exceeds about 5 mils (0.005 inch) in one or more sheets being subjected to line or strip welding, and unsatisfactory welds are common when this variation is 10 mils or more. In consequence, there is a distinct need for improved techniques for the heat sealing or bonding or relatively thin articles having considerable variation in the thickness of walls or panels.

The instant invention is concerned with a simple method using uncomplicated apparatus for producing dependable welds without gaps in assembled layers of thermoplastic sheets of very uneven thickness as well as those of even thickness.

The novel heat sealing process of this invention is practiced by firmly clamping a plurality (i.e. two or more) of flexible layers of weldable or sealable thermoplastic material in superimposed relationship along two spaced areas separated by an unclamped elongated strip of said superimposed layers, pressing an elongated heated member against said elongated strip with sufficient pressure to flex and stretch said plurality of layers therein sufficiently to bring the flexed area of each of said layers into substantially full contact with each adjoining flexed layer and maintaining said pressure until the heat of said member bonds at least two of said layers together along substantially the entire flexed length of said elongated strip.

Other aspects of the invention relate to preferred thermoplastic materials; the preferred shape of the part of the heated press member which engages the thermoplastic material; using a grooved clamp member without exerting pressure against the bottom of the groove when the unclamped elongated strip is flexed; the sealing of layers or sheets in assemblies of uneven thickness, as for instance those varying more than 5 or 10 mils in total thickness, and the interlocking of the materials being joined. Still other features of the invention and its benefits will be apparent to those skilled in the art upon consideration of the detailed disclosure hereinafter.

The process of the present invention may be employed in welding or sealing a wide variety of weldable thermoplastic materials including those containing polystyrene, polyethylene, polypropylene, polyallomers, nylon, formaldehyde polymers, plasticized polyvinyl chloride and related vinyl polymers, ethyl cellulose, cellulose acetate, cellulose acetate-butyrate, polymethylmethacrylate and acrylonitrile-butadiene-styrene resins to name only a few for illustrative purposes. Such resins may be composed of homopolymers, copolymers or various blends thereof as well as various additives known in the art, including colorants, plasticizers, heat stabilizers, extenders, fillers, and inhibitors against degradation due to oxidation, ultraviolet light, etc. High impact, modified polystyrene produced by copolymerizing styrene with a lesser amount of a hydrocarbon elastomer or another rubbery polymer is one type of widely used resin which may be utilized in the present process. The materials should have sufficient flexibility at room temperature to withstand a moderate degree of flexing under pressure before they are softened by heat in the bonding operation as described hereinafter.

The sheets or articles to be welded may be fabricated by a number of conventional techniques including, inter alia, extrusion, thermoforming, injection molding, compression molding, blow molding, calendering and laminating. The new method is particularly suitable for joining sheets or articles having a wall thickness between about 5 and 60 mils, and it is especially recommended for uniting layers of about 10 to 25 mils thickness. The total thickness of the layers of material assembled for welding may range from about 15 up to 125 mils or more.

For a better understanding of the nature and objects of this invention, reference should be had to the accompanying drawings in which many conventional apparatus details are omitted for greater clarity. Certain other details have been exaggerated, particularly the thickness of the layers of thermoplastic material, for the purpose of better illustration.

Figure 1:
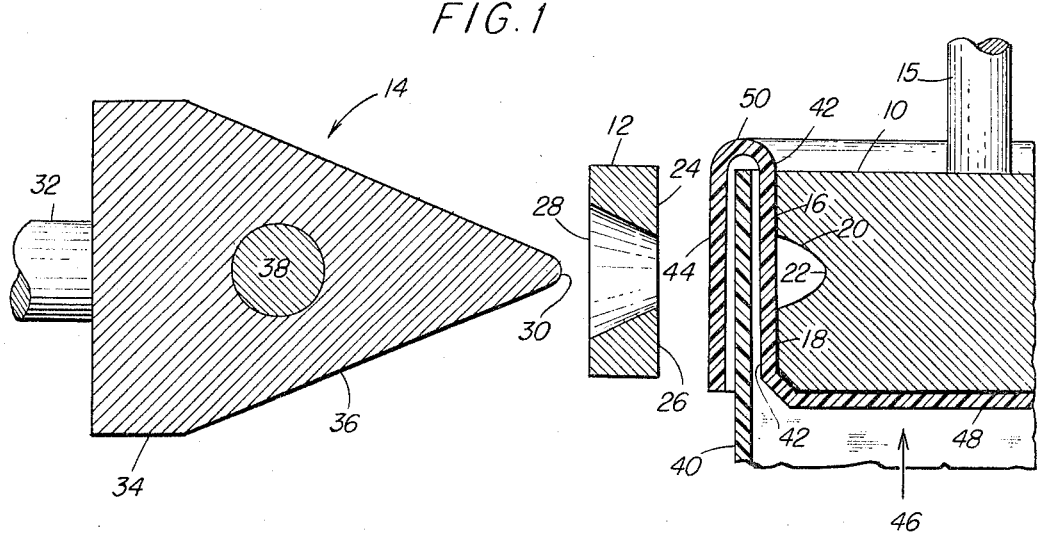
FIG. 1 is a fragmentary, enlarged vertical section of an article assembled for heat sealing in a subsequent step.

Turning now to FIG. 1, the main apparatus elements shown are a grooved anvil or backing member 10, a slotted clamping frame 12 and the heated pressing shoe 14.

The anvil 10 supports or backs up the article to be sealed during the welding operation, and it is attached to a shaft or rod 15. For purposes of illustration, the anvil may be regarded as fixed in position, even though it may be subjected to intermittent reciprocating motion in one or more directions or rotation when mounted in commercial automatic machinery. On the operating side of the anvil there are two clamping faces or strips 16 and 18 which are separated by an elongated groove 20 having a bottom 22.

The clamping frame 12 also has two clamping faces or elongated areas 24 and 26 which coact with the anvil clamping faces 16 and 18 respectively to securely fasten therebetween the assembled layers of material to be sealed. This effectively prevents any motion or appreciable slipping of the various layers of thermoplastic material being welded except for flexure in the elongated strip or area lying across the groove 20. To accomplish this, the clamping device 12 is mounted in a suitable machine frame (not shown) for guided and timed movement toward and away from the clamping faces 16 and 18 of the anvil using compressed air or hydraulic cylinders or other suitable means (not shown) for producing that motion and providing the necessary clamping force. The clamping frame 12 is provided with a tapered slot 28 of suitable length and width to permit the rounded edge 30 of the press shoe 14 to protrude therethrough during the sealing operation. The width of slot 28 on the side facing the anvil desirably corresponds to the width of the groove 20 in the anvil. Although a unitary clamp member 12 is preferred for simplicity, this unit may be divided into two separate clamps each having a clamping face corresponding to one of the faces 24 and 26.

Figure 2:
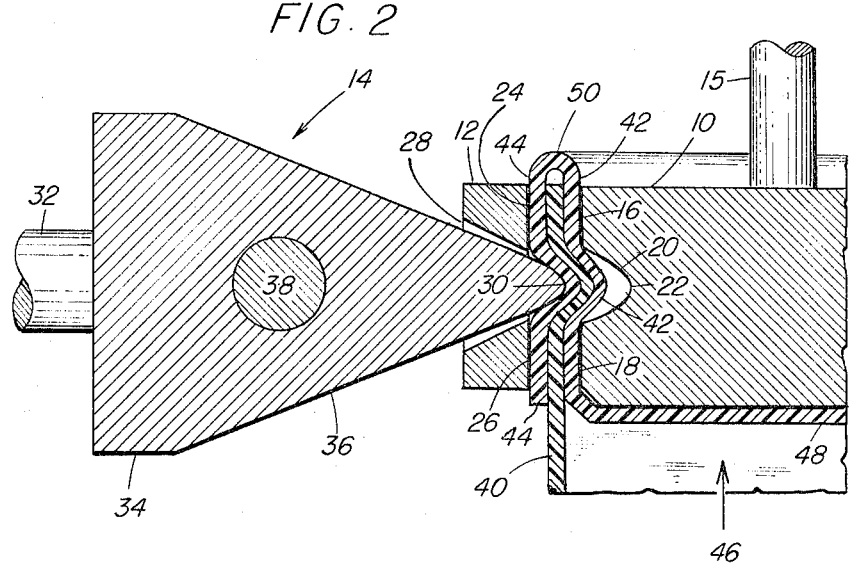
FIG. 2 is a similar view at a later stage in which the article is firmly clamped and subjected to heat and pressure during the heat sealing operation.

In FIG. 1, the male press shoe 14 is shown in its retracted position and it may be mounted on one or more rods or shafts 32 and actuated by pneumatic or hydraulic cylinders or other suitable means for periodic reciprocating movement toward and away from the anvil 10 as is apparent by reference to FIG. 2. Alternatively, the shoe 14 may be fixed and the anvil 10 together with clamp 12 and the assembly to be sealed may be moved against a fixed shoe 14.

The male die or shoe 14 is desirably of relatively massive construction in order to function as a heat sink or reservoir in storing ample heat for maintaining a constant temperature during rapidly repeated heat sealing cycles. Accordingly, it is usually fashioned of metal with a heavy base 34 and a tapered section 36 extending out to the narrow, rounded edge 30 which is elongated in a direction perpendicular to the plane of FIG. 1. It is heated by a thermostatically controlled, electrical resistance heating element 38 or other suitable heating means.

Portions of a container ready to be sealed are shown assembled in the heat sealing apparatus in FIG. 1. The wall 40 of the body of an open ended container (which has previously been filled with the desired product) is engaged with the spaced walls 42 and 44 of the closure 46. This particular closure is designed to eventually become either the top or bottom of a container of square cross section, and it is provided with a recessed center 48 and an upturned edge which has the double walls 42 and 44 connected by a fold or U-bend section 50.

The body and the lid of the container are made of a flexible, weldable thermoplastic material, as exemplified by a high impact polymeric styrene resin in the form of a graft polymer produced by copolymerizing 87 parts of monomeric styrene with 13 parts by weight of polybutadiene. Both container elements may be produced by thermoforming sheets of extruded resins under vacuum while in a plastic or heat softened condition.

Containers of square cross section are popular, perhaps by reason of their efficient utilization of storage and shipping space, and they frequently have a height or depth which is from 1 to 3 times the diameter or width. However, in thermoforming such container bodies with relatively thin walls, the deep draw tends to produce container walls which are considerably thicker at the corners than in the center of the sides. The corners are often more than twice as thick as certain parts of the side walls and it is difficult to seal a container closure to an edge of a container wall which may vary from say 17 mils in the center of the body edge to a thickness of as much as 40 mils at the corners of the body edge without producing unacceptable gaps or discontinuities in the seal.

The operation of the invention is extremely simple. With the shoe 14 and clamp member 12 in the retracted position of FIG. 1, electric current is supplied to the heating element 38 in the shoe to bring it up to a proper temperature for sealing the thermoplastic material. Different thermoplastic resins have considerably different heat softening characteristics and the operating temperature is determined by a number of factors including the particular resin composition, the thickness of the layers, the pressure applied and the length of the pressing period. For thermoplastic resins in general, it may range from about 250 to 600° F. A temperature of about 350 to 550° F. is suitable for heat sealing the high impact polystyrene described, and the range of about 350 to 450° F. is usually preferred.

Next, the closure 46 and the container body are assembled in contact with the anvil 10 in the position illustrated in FIG. 1. Then the clamping frame 12 is forced against the outside wall 44 of the closure to firmly clamp the upper part of the assembled thermoplastic layers securely between the clamping faces 16 and 24 and the lower part of that assembly between the faces 18 and 26 with sufficient pressure to restrain the assembled thermoplastic layers 42, 40 and 44 against any appreciable movement in the clamped areas. The clamping action also brings the narrow side of slot 28 into registry with the groove 20.

As soon as the material to be sealed is firmly clamped, the heated male shoe 14 advances through the slot 28 to the position shown in FIG. 2 under sufficient pressure to flex or bend the elongated, unclamped strip of layers of thermoplastic material lying across the narrow groove 20 and push the assembled layers into that groove. Thus, the narrow area which is actually bonded or sealed lies in the strip which separates the two clamped areas. The movement of the shoe 14 is checked by suitable stop or limiting devices (not shown) of conventional type before the flexed part of wall 42 is in contact with bottom 22 of the groove. After enough time has elapsed for sufficient heat transfer from the shoe 14 through the thermoplastic material to bond at least two layers thereof together, the actuating mechanism for the shoe is reversed to retract this press member to the position shown in FIG. 1; then clamp frame 12 is similarly withdrawn.

After the welded article is disengaged from the anvil 10, it is found that the body wall 40 and the end closure 46 are welded together in an excellent fluid-tght seal. The sealed strip has a distinct groove therein which enhances the rigidity of that portion of the container. A well defined, permanently formed groove indicates that a good weld has been produced; also it serves to improve the seal by interlocking the layers of thermoplastic material, thereby enhancing the mechanical strength of the joint.

In the aforesaid sealing operation, as the edge 30 of the advancing shoe 14 presses against the elongated unclamped strip of thermoplastic material lying across groove 20, it bends this strip area of the flat walls 44, 40, 42 into curves as it pushes them into the groove. Inasmuch as the width measured around the curve of these flexed layers is greater than their original width lying across groove 20 in flat and relaxed condition as well as the fact that their adjacent areas are clamped against movement at the faces 16 and 18, substantial stretching of the unclamped strip does occur. This bulging or combination of stretching and flexing brings the faces of wall 40 in the elongated strip into firm and complete contact with the adjoining faces of walls 44 and 42, even though one or more of these walls may have considerable variations in thickness along the length of the unclamped strip which would prevent full and intimate contact along the entire strip if conventional bonding techniques were employed. At the same time, heat is being transferred from the edge 30 of the heated shoe and this creates plastic flow by softening the thermoplastic material to further improve the full contact between the various layers in the elongated strip.

The groove 20 should desirably be of sufficient depth and the travel of heater or shoe 14 should be limited so that the flexed portion of wall 42 does not reach the bottom 22 of the groove otherwise the thickest portion of the assembled layers would reach the bottom of the groove first and thereby concentrate most of the pressing force in the thickest portion while restricting the amount of flexing to which other parts of the elongated strip assembly were subjected.

The narrow bearing edge 30 of the press shoe may desirably have a transverse cross section in the form of any smooth convex curve. For most purposes, a rounded edge is preferred as it appears to produce the best flexing and heat sealing action, and its radius may depend somewhat upon the total thickness of the particular assembly being bonded. However, it is also contemplated that in some cases the heat sealing edge of the shoe may be bevelled or chamfered, but usually not to the extent of forming a knife edge which might cut the thermoplastic material.

By suitable regulation of the temperature of shoe 14 and the duration of the pressing period, which usually amounts to about 1 to 5 seconds for welding layers having a total thickness of about 15 to 40 mils, it is possible to bond only walls 44 and 40 together or to heat seal all three walls together.

The amount of force applied by the shoe 14 during the pressing operation depends on a number of factors including the total thickness of the assembled layers of material to be sealed, their strength and resilience, variations in the various layers and the sealing temperature. Too much pressure on the elongated strip of unclamped layers can crack or fracture thermoplastic material of low flexibility or it can stretch thin flexible material to the extent of weakening the areas. Insufficient pressure fails to provide the degree of stretching and flexing necessary for intimate and firm contact between the layers to be sealed together thereby producing a bond with gaps along its lengeth. For the purpose of illustration, the forces exerted by the shoe 14 may be expressed in terms of pounds per linear inch of length of edge 30, and a pressure of about 40 pounds per inch may be utilized with a thin assembly of thermoplastic materials having a total thickness of about 15 mils, while a force of about 100 pounds per inch may be suitable for a thicker assembly with an overall thickness of about 40 mils.

By securely fastening the assembled layers of thermoplastic material with the slotted clamp 12, heat distortion or shrinkage in areas of that material adjoining the strip to be sealed is greatly reduced. However, in some instances, it may be desirable to construct the clamping frame of an insulating material such as a heat-resistant fabric reinforced phenol-formaldehyde resin to minimize the exposure of an especially heat sensitive material (e.g. layers of biaxially oriented polystyrene) to heat from the shoe 14. Alternatively, a metal clamp frame 12 may be provided with passages for a cooling medium, such as water.

The process of this invention is not restricted to a straight pressing edge 30 and straight groove 20 for the press shoe 14 may have an edge in a form of a 90° corner or L which is adapted to simultaneously engage layers of thermoplastic material clamped against two sides of a square anvil 10 having a groove on each side. In addition the bearing edge of shoe 14 may be of arcuate shape for sealing cylindrical container bodies clamped by a slotted arcuate clamp against a cylindrical anvil provided with a groove around the periphery thereof.

Although the present invention has been described by reference to extremely simple apparatus in order to emphasize the principles involved, it will be readily apparent to those skilled in the art that the invention may be employed in automatic machines as is conventional in the handling, filling and sealing of containers in large numbers. Moreover, a single sheet of thermoplastic material may be folded one or more times and the resulting layers welded together, or layers of thermoplastic materials of different chemical composition may be united by the instant process. Also, while a pressing operation in which only one sealing shoe is shown in conjunction with the anvil 10, other variations may be employed such as having two such shoes coact with opposite sides of the anvil or four of the shoes simultaneously pressing against four grooved faces of the anvil.

Many other such variations or modifications of the present invention may be made without departing from its purview; accordingly, this invention should not be construed as limited in any particulars except as may be recited in the appended claims or required in the prior art.

What is claimed is:

1. A heat sealing process which comprises firmly clamping a plurality of flexible layers of weldable thermoplastic material in superimposed relationship along two spaced areas separated by an unclamped elongated strip of said superimposed layers, pressing an elongated heated member against said elongated strip with sufficient pressure to flex and stretch said plurality of layers therein sufficiently to bring the flexed area of each of said layers into substantially full contact with each adjoining flexed layer and maintaining said pressure until the heat of said member bonds at least two of said layers together along substantially the entire flexed length of said elongated strip.

2. A process according to claim 1 in which at least one of said layers contains polymeric styrene.

3. A process according to claim 1 in which at least one of said layers contain a copolymer of styrene and a hydocarbon elastomer.

4. A process according to claim 1 in which at least one of said layers is of uneven thickness.

5. A process according to claim 1 in which at least one of said layers varies in thickness more than 5 mils along said flexed length of the elongated strip.

6. A process according to claim 1 in which the thickness of each of said layers is greater than 5 mils, and the total thickness of said layers varies more than 10 mils along said flexed length of the elongated strip.

7. A process according to claim 1 in which said flexed layers of said elongated strip are projected into a groove of a clamp member during said pressing operation without exerting substantial pressure against the bottom of said groove.

8. A process according to claim 1 in which the part of said heated member engaging the said elongated strip of superimposed layers of thermoplastic material is an elongated edge having a narrow and convexly curved transverse cross section.

9. A heat sealing process which comprises assembling a plurality of flexible layers of weldable thermoplastic material in at least partially superimposed relationship, firmly clamping said superimposed assembly along two spaced areas separated by an unclamped elongated strip of said superimposed layers, pressing an elongated heated member against said elongated strip with sufficient pressure to substantially flex layers therein into an interlocked relationship and to stretch said plurality of layers therein sufficiently to bring the flexed area of each of said layers into substantially full contact with each adjoining flexed layer, and maintaining said pressure until heat transferred from said heated member seals at least two of said layers together in interlocked relationship along substantially the entire flexed length of said elongated strip.

References Cited by the Examiner

UNITED STATES PATENTS 789,695  5/1905  Kempshall.
1,939,683  12/1933  Foehr _____ 264—258 X ROBERT F. WHITE, *Primary Examiner.*

T. J. CARVIS, *Assistant Examiner.*